United States Patent
Martinelli et al.

(10) Patent No.: US 6,996,135 B2
(45) Date of Patent: Feb. 7, 2006

(54) CASCADED RAMAN LASER

(75) Inventors: Catherine Martinelli, Palaiseau (FR); Florence Leplingard, Versailles (FR); Thibaut Sylvestre, Besancon (FR); Frédérique Vanholsbeeck, Brussels (BE); Phillippe Emplit, Rixensart (BE)

(73) Assignee: Alcatel, Paris (FR)

( * ) Notice: Subject to any disclaimer, the term of this patent is extended or adjusted under 35 U.S.C. 154(b) by 327 days.

(21) Appl. No.: 10/624,510

(22) Filed: Jul. 23, 2003

(65) Prior Publication Data

US 2004/0125827 A1 Jul. 1, 2004

(30) Foreign Application Priority Data

Jul. 24, 2002 (EP) .................. 02360221

(51) Int. Cl.
*H01S 3/30* (2006.01)
(52) U.S. Cl. ............................. 372/3; 372/6
(58) Field of Classification Search .............. 372/6, 372/3, 102, 28, 26; 359/337, 341, 334
See application file for complete search history.

(56) References Cited

U.S. PATENT DOCUMENTS

| | | | |
|---|---|---|---|
| 5,323,404 A | 6/1994 | Grubb | |
| 6,163,552 A * | 12/2000 | Engelberth et al. | 372/3 |
| 6,285,806 B1 * | 9/2001 | Kersey et al. | 385/12 |
| 6,310,899 B1 * | 10/2001 | Jacobovitz-Veselka et al. | 372/6 |
| 6,407,855 B1 * | 6/2002 | MacCormack et al. | 359/346 |
| 2002/0015219 A1 | 2/2002 | Mohammed | |

OTHER PUBLICATIONS

J.-C. Bouteiller et al, "Dual-order Raman pump providing improved noise figure and large gain bandwidth", OFC 2002 Postdeadline Papers, pp. FB3-1-FB3-3.

* cited by examiner

*Primary Examiner*—Minsun Oh Harvey
*Assistant Examiner*—Tuan N. Nguyen
(74) *Attorney, Agent, or Firm*—Sughrue Mion, PLLC

(57) ABSTRACT

A cascaded Raman laser (10) has a pump radiation source (12) emitting at a pump wavelength $\lambda_p$, an input section (14) and an output section (16) made of an optical medium. Each section (14, 16) comprises wavelength selectors (141, 142, ..., 145 and 161, 162, ..., 165) for wavelengths $\lambda_1$, $\lambda_2$, ..., $\lambda_{n-k}$, where $n \geq 3$, $\lambda_p < \lambda_1 < \lambda_2 < ... < \lambda_{n-1} < \lambda_n$ and $\lambda_{n-k+1}, \lambda_{n-k+2}, ..., \lambda_n$ being $k \geq 1$ emitting wavelengths of the laser (10). The laser further comprises an intracavity section (18) that is made of a non-linear optical medium, has a zero-dispersion wavelength $\lambda_0$ and is disposed between the input (14) and the output (16) section. The wavelengths $\lambda_1$, $\lambda_2$, ..., $\lambda_{n-k}$ of the wavelength selectors (141, 142, ..., 145 and 161, 162, ..., 165) and the zero-dispersion wavelength $\lambda_0$ of the intracavity section (18) are chosen such that energy is transferred between different wavelengths by multi-wave mixing.

10 Claims, 4 Drawing Sheets

CASCADED RAMAN LASER

BACKGROUND OF THE INVENTION

The invention is based on a priority application EP 02360221.2 which is hereby incorporated by reference.

The invention relates to a cascaded Raman laser comprising a pump radiation source emitting at a pump wavelength $\lambda_p$, an input section and an output section made of an optical medium, each section comprising wavelength selectors for wavelengths $\lambda_1, \lambda_2, \ldots, \lambda_{n-k}$, where $n \geq 3$, $\lambda_p < \lambda_1 < \lambda_2 < \ldots < \lambda_{n-1} < \lambda_n$ and $\lambda_{n-k+1}, \lambda_{n-k+2}, \ldots, \lambda_n$ being $k \geq 1$ emitting wavelengths of the laser, and an intracavity section that is made of a non-linear optical medium, has a zero-dispersion wavelength $\lambda_0$ and is disposed between the input and the output section.

Such lasers are generally known in the art, for example from U.S. Pat. No. 5,323,404.

Raman lasers typically comprise a pump source, usually a continuos wave (CW) laser, and a length of an non-linear optical medium, for example an optical fiber. Two reflectors having the same peak reflectivity are spaced apart on the optical fiber so as to form an optical laser cavity. The underlying physical principle of such lasers is the effect of spontaneous Raman scattering. This is a non-linear optical process that only occurs at high optical intensities and involves coupling of light propagating through the non-linear medium to vibrational modes of the medium, and re-radiation of the light at a different wavelength. Re-radiated light upshifted in wavelength is commonly referred to as a Stokes line, whereas light downshifted in wavelength is referred to as an Anti-Stokes line. Raman lasers are typically used an a configuration in which pump light is upshifted in wavelength. When a silica fiber is used as the non-linear medium, the strongest Raman scattering (maximum Raman gain) occurs at a frequency shift of about 13.2 THz, corresponding to a wavelength shift of about 50–100 nm for pump wavelengths between about 1 and 1.5 $\mu$m.

In Raman lasers that are configured as ring lasers, the non-linear optical fiber is closed by a coupler or an optical circulator so that a fiber loop is obtained. The reflectors are then usually replaced by optical filters, for example Fabry-Perot-Filters, having a specified passband center wavelength. The generic term "wavelength selectors" will henceforth be used for designating reflectors, filters or other means that are used to define optical resonators in Raman lasers.

A "cascaded" Raman laser is a Raman laser that has, in addition to an optical cavity for radiation of an emission wavelength $\lambda_n$, at least one further optical cavity for radiation of wavelength $\lambda_{n-1} < \lambda_n$, where $n \geq 2$. In such cascaded Raman lasers radiation undergoes more than one Stokes transitions so that it is subsequently upshifted in wavelength. If radiation with more than one wavelength is coupled out of the laser, such a laser is referred to as a multi-wavelength Raman laser.

Raman lasers are often used as pump lasers for Raman amplifiers at 1310 or 1550 nm, or as 1480 nm pump lasers for remotely pumped erbium fiber amplifiers in repeaterless optical fiber communication systems. Uses for other purposes at other wavelengths are possible and contemplated.

One of the key properties of cascaded Raman lasers is the conversion efficiency which is defined as the ratio between output power of the laser and optical pump power at the input side. Another key property is the threshold pump power that has to be exceeded for generating a substantial optical output power, i.e. an output power of at least some mW. With pump powers below the threshold, there is only an insignificant optical output power in the order of several $\mu$W.

A Raman laser having a low pump threshold is desirable in many respects. For example, it should allow to generate a low but stable output power. Although in many applications high output powers are an essential feature, there are other applications which require such low and stable output powers.

SUMMARY OF THE INVENTION

An example for such an application is a Raman laser for second order pumping. In a typical configuration of such a second order pump laser, two low-power pump sources are boosted, pursuant to the first order pumping principle as explained above, by a single high-power source. The two low-power sources may then, for example, amplify a transmission signal. Such a configuration is considerably less expensive than current long-haul transmission systems which require the use of two high-power pump sources.

In principle, such a configuration would require low-power pump sources emitting only a few mW. Currently, however, pump lasers with such low but stable output powers are not available for the required wavelength range.

From a paper by J.-C. Bouteiller et al. entitled "Dual-order Raman pump providing improved noise figure and large gain bandwith", FB3-1, OFC 2002 Postdeadline Paper, it is known to combine the high-power and the low-power sources in a single cascaded Raman laser device. The stable low-power output is achieved by attenuating an originally stable and high-power laser line in a narrow long period grating.

From US-A1-2002/0015219 a non-linear fiber amplifier is known that is particularly suited for the low-loss window at approximately 1430–1530 nm. This broadband non-linear polarization amplifier combines cascaded Raman amplification with parametric amplification or four-wave mixing. One of the intermediate cascade Raman order wavelengths should lie in close proximity to the zero-dispersion wavelength $\lambda_0$ of the amplifying fiber. For this intermediate Raman order, spectral broadening will occur due to phase-match with four-wave mixing or phase-matched parametric amplification. In further cascaded Raman orders, the gain spectrum continues to broaden due to the convolution of the gain spectrum with a spectrum from the previous Raman order. This document, however, does not relate to the issue of cascaded Raman lasers with low pump power threshold.

It is, therefore, an object of the present invention to provide a cascaded Raman laser as mentioned at the outset that has a low pump power threshold.

This object is achieved, with a laser as mentioned at the outset, in that the wavelengths $\lambda_1, \lambda_2, \ldots, \lambda_{n-k}$ of the wavelength selectors and the zero-dispersion wavelength $\lambda_0$ of the intracavity section are chosen such that energy is transferred between radiation of different wavelengths by multi-wave mixing.

Since Raman scattering is now assisted by multi-wave mixing, energy is transferred from radiation with shorter wavelengths to radiation with longer wavelengths more efficiently. This boosting of Stokes transitions by multi-wave mixing allows to achieve a stable low-power output. The new cascaded Raman laser is therefore particularly suited as a low-power pump source in configurations with second order pumping as explained above, but of course not restricted to such use.

The more efficient energy transfer between Stokes lines has also the advantage that the last Stokes line(s) corresponding to the emitting wavelength(s) of the laser appear(s), in a spatial sense, sooner in the propagation direction of the light. Thus, it is possible to reduce the length of the intracavity section, for example a Raman active fiber.

The term multi-wave mixing is used herein as a generic term for the phenomena of four-wave mixing and degenerated four-wave mixing, the latter being often referred to as three-wave mixing.

Each pair of wavelength selectors for a specific wavelength forms an optical cavity for radiation of a wavelength equal to this wavelength. The wavelength selectors may be realized as reflectors, for example Bragg gratings, having a specific center wavelength which is defined as the peak wavelength of the reflectivity band of the reflector.

The input and the output sections are considered to be those sections of the Raman laser that contain the wavelength selectors. The intracavity section of the laser is a central section without selectors and is disposed between the input section and the output section. There is no constraint with respect to the optical mediums that form the input, the output and the intracavity section, as long as only the intracavity section is made of materials showing non-linear effects, particularly spontaneous Raman scattering, when exposed to high optical intensities. The sections may be formed as different optical mediums and made of different materials, but it is also possible that the input, the output and the intracavity section is formed as a single continues waveguiding structure that is divided into different sections only conceptionally.

The desired effect of energy transfer by multi-wave mixing requires that the zero-dispersion wavelength $\lambda_0$ is chosen such that linear phase matching occurs. The applicable phase matching condition will depend on the Stokes transitions that shall be assisted by multi-wave mixing. However, this does not mean that the applicable phase matching condition will have to be fulfilled exactly. Deviations of the zero-dispersion wavelength $\lambda_0$ from the ideal value of +/−10 nm will still allow multi-wave mixing to become sufficiently large.

Multi-wave mixing does not necessarily has to involve any of the wavelengths that are to be coupled out of the laser. However, it is particularly preferred if at least one of the emitting wavelengths of the laser is involved in multi-wave mixing. If only one wavelength is emitted by the laser, this means that additional energy is transferred to the emitted radiation by multi-wave mixing.

The wavelengths $\lambda_1, \lambda_2, \ldots, \lambda_{n-k}$ of the wavelengths selectors may be chosen so that energy transfer by multi-wave mixing involves at least three adjacent wavelengths. This is particularly advantageous if only radiation of one wavelength shall be coupled out of the laser.

In order to achieve four-wave mixing in this case, the center wavelength of the reflectors have to be chosen so that $1/\lambda_i = 1/\lambda_{i-1} + 1/\lambda_{i-2} - 1/\lambda_{i-3}$, where i=3, 4, ..., n, and that the zero-dispersion wavelength $\lambda_0$ of the intracavity section (18) substantially equals $(\lambda_{i-1} + \lambda_{i-2})/2$.

In order to achieve three-wave mixing in this case, the wavelengths $\lambda_1, \lambda_2, \ldots, \lambda_{n-k}$ of the wavelengths selectors have to be chosen so that $1/\lambda_i = 2/\lambda_{i-1} - 1/\lambda_{i-2}$, where i=3, 4, ..., n, and that the zero-dispersion wavelength $\lambda_0$ of the intracavity section (18) substantially equals $\lambda_{i-1}$.

However, it is not required that multi-wave mixing involves only adjacent Stokes lines. Particularly for lasers emitting radiation with more than one wavelength it is preferred if the wavelengths $\lambda_1, \lambda_2, \ldots, \lambda_{n-k}$ of the wavelengths selectors are chosen so that energy transfer by multi-wave mixing involves at least three non-adjacent wavelengths.

For example, if radiation of two different wavelengths shall be coupled out of the laser, four-wave mixing may be achieved if the wavelengths $\lambda_1, \lambda_2, \ldots, \lambda_{n-2}$ of the wavelengths selectors are chosen so that $1/\lambda_i = 1/\lambda_{i-2} + 1/\lambda_{i-3} - 1/\lambda_{i-5}$ and $1/\lambda_{i-1} = 1/\lambda_{i-2} + 1/\lambda_{i-3} - 1/\lambda_{i-4}$, where i=5, 6, ..., n, and that the zero-dispersion wavelength $\lambda_0$ of the intracavity section (18) substantially equals $(\lambda_{i-2} + \lambda_{i-3})/2$.

The condition for three-wave mixing is in this case that the wavelengths $\lambda_1, \lambda_2, \ldots, \lambda_{n-1}$ of the wavelengths selectors are chosen so that $1/\lambda_i = 2/\lambda_{i-2} - 1/\lambda_{i-4}$ and $1/\lambda_{i-1} = 2/\lambda_{i-2} - 1/\lambda_{i-3}$, where i=5, 6, ..., n, and that the zero-dispersion wavelength $\lambda_0$ of the intracavity section (18) substantially equals $\lambda_{i-2}$.

It should be noted, however, that multi-wave mixing can be achieved in various other ways that differ from the exemplary conditions given above.

Due to the assistance of multi-wave mixing it is not necessary to provide optical cavities also for those emitted wavelengths that profit from multi-wave mixing in the sense that energy is transferred more efficiently to radiation of those wavelengths.

However, in order to improve laser stability it is preferred that for each emitting wavelength an additional wavelength selector for wavelength $\lambda_{n-k+1}, \lambda_{n-k+2}, \ldots, \lambda_n$, respectively, is provided in the input section and in the output section.

The components of the new cascaded Raman laser have so far been referred to in general terms. For example, no restrictions are made as to whether the laser is realized in a linear or in a ring laser configuration. The input and the output sections as well as the intracavity section may be formed by any known waveguiding structure, for example a planar optical waveguide.

It is, however, particularly preferred if the input and the output sections are optical fibers and the intracavity section is a Raman active optical fiber, as is known in the art as such.

The type of selector chosen will depend on the particular waveguiding structure that is used for the new laser. For optical fibers, in principle any reflecting means having a high reflectivity, for example a multilayer structure formed directly on a fiber end face, could be used. Particularly preferred reflectors for optical fibers are in-line Bragg gratings.

BRIEF DESCRIPTION OF THE DRAWINGS

The above and other advantages and features of the present invention will become apparent from the following description of a preferred embodiment given in conjunction with the accompanying drawings, in which:

FIG. 4a is a simplified energy level diagram illustrating the process of three-wave mixing in an optical fiber in a representation similar to that of FIG. 3a;

FIG. 1 schematically depicts an exemplary embodiment of a cascaded Raman laser according to the invention being designated in its entirety by 10. Laser 10 comprises a pump source 12 emitting radiation of wavelength $\lambda_p$. Neodymium or ytterbium fiber lasers or another Raman laser may be used as pump source 12. Furthermore, any other single-mode laser, both fiber and based on voluminous elements, including crystals, doped with metal ions, may be used as a pump source 12.

Figure 1:
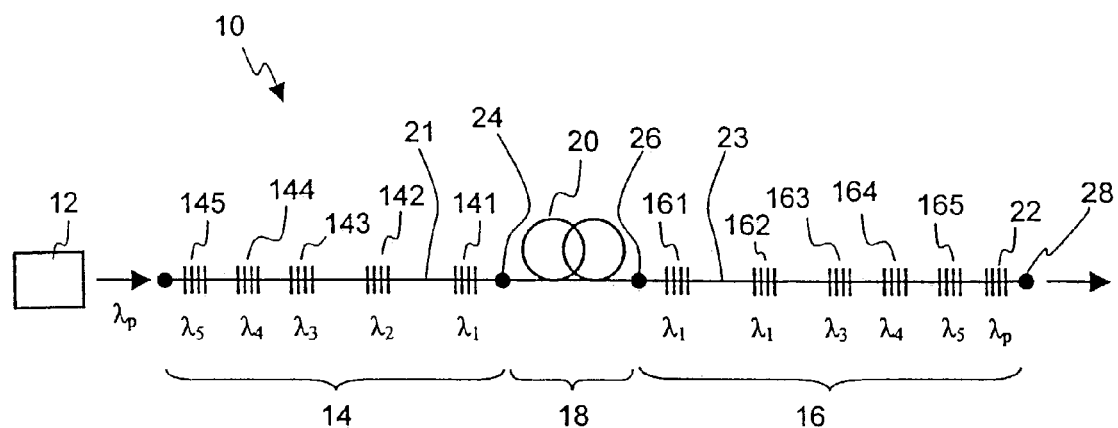
FIG. 1 shows a schematic diagram of a cascaded Raman fiber laser according to the invention.

Laser 10 further comprises an input section 14, an output section 16 and an intracavity section 18 that is disposed between input section 14 and output section 16. Intracavity section 18 consists, in this embodiment, of a phosphosilicate Raman active fiber 20 displaying a strong non-linear response to high-power optical intensities. Raman active fibers that are particularly designed for this purpose are known in the art as such and will, therefore, not be described in more detail.

Input section 14 comprises an input fiber 21 which is a normal low loss optical fiber. However, input fiber 21 can, in principle, also be a Raman active fiber. In the embodiment shown, N=5 fiber Bragg gratings 141, 142, ..., 145 are formed on input fiber 21.

Output section 16 comprises an output fiber 23 that is of the same kind as input fiber 23. However, output fiber 23 can, in principle, also be a Raman active fiber or be of a type distinct from input fiber 21. In the output section 16 an equal number of N=5 optical fiber Bragg gratings 161, 162, ..., 165 are formed on output fiber 23.

The input group of Bragg gratings 141, 142, ..., 145 and the output group of Bragg gratings 161, 162, ..., 165 are used as reflectors having reflectivity bands with center wavelengths $\lambda_1, \lambda_2, \ldots, \lambda_5$, respectively. Each pair of Bragg gratings having a matching center wavelength $\lambda_i$ forms an optical resonator for wavelength $\lambda_i$ that comprises at least a part of the length of the Raman active fiber 20 of the intracavity section 18.

The cavity length may, for example, be in the range of a few hundred meters up to a few kilometers. Since the attenuation of Raman active fiber 20, input fiber 21 and output fiber 23 typically depends on the wavelength, the optimum cavity length for given wavelengths will be different for different wavelengths. Since in-line fiber Bragg gratings can be essentially 100% transmissive at wavelengths outside of their reflection band, a flexible placement of all Bragg gratings is possible. For instance, the optical cavities may be sequential or overlapping to various degrees. In the embodiment shown in FIG. 1, it is assumed that $\lambda_1 < \lambda_2 < \ldots < \lambda_5$. As can be seen in FIG. 1, the cavity lengths increase with growing center wavelengths.

All of the above-mentioned Bragg gratings desirably have high reflectivity of preferably more than 98% at their center wavelength. Only Bragg grating 165 in output section 16 has a low reflectivity (typically in the range between 5% and 15%) for radiation of wavelength $\lambda_5$. This is because wavelength $\lambda_5$ is the emitting wavelength of laser 10 that shall, at least to a large degree, be coupled out of laser 10. Bragg grating 165 can also be replaced by a cleaved fiber end that provides sufficient reflectivity.

Laser 10 further comprises in its output section 16 an additional unpaired high reflectivity Bragg grating 22 having a center wavelength $\lambda_p$. This unpaired Bragg grating 22 reflects pump light with wavelength $\lambda_p$ and thus provides for at least dual passage of the pump radiation along Raman active fiber 20 and, thus, more effective use of pump radiation.

Reference numerals 24 and 26 designate a first and a second welding point at which Raman active fiber 20 of the intracavity section 18 is connected to input fiber 21 and to output fiber 23, respectively. However, as already mentioned above, all Bragg gratings may be included directly in Raman active fiber 20 so that no welding points are necessary. Such a variant is preferable from the point of view of reducing losses of optical radiation in the resonators.

Reference numeral 28 designates an output of laser 10 at which radiation with wavelength $\lambda_n$ may be coupled into a long-haul communication fiber, for example.

In the following the function of Raman laser 10 will be explained in more detail. Raman lasers are, as already mentioned at the outset, based on an non-linear process that is referred to as spontaneous Raman scattering. Raman scattering results from the interaction of intense light with optical phonons in an optical medium, for example silica fibers. Raman scattering leads to a transfer of energy from one optical beam, for example light emitted by pump source 12 having a wavelength $\lambda_p$, to another optical beam, for example light of a wavelength $\lambda_1$. If $\lambda_1 > \lambda_p$ (i.e. wavelength upshift), this transfer is referred to as a Stokes transition. The other case with $\lambda_1 > \lambda_p$ (wavelength downshift) is referred to as an Anti-Stokes transition. For achieving a Stokes or an Anti-Stokes transition in a Raman laser, it has to be ensured that all center wavelengths $\lambda_1, \lambda_2, \ldots, \lambda_n$ of the optical reflectors are within the Raman gain spectrum. The latter is determined by possible vibrational modes of Raman active fiber 20.

To become more specific, pump radiation emitted by pump light source 12 is, during laser action, coupled into input section 14 and propagates essentially unimpeded through input section 14 into intracavity section 18, where most of it will be converted by Raman scattering to a radiation with longer wavelength $\lambda_1$. This radiation with upshifted wavelength is then reflected by Bragg grating 161 with center wavelength $\lambda_1$ in the output section 16. This re-directed radiation of wavelength $\lambda_1$ propagates back through Raman active fiber 20 where it is then substantially converted by Raman scattering to radiation having a wavelength $\lambda_2$. This radiation is now reflected by Bragg grating 142 in input section 14. This process of wavelength conversion by Raman scattering continues until radiation with a wavelength $\lambda_5$ is produced. This radiation is then available for utilization and may be coupled out of laser 10 via output 28.

The above discussion of the laser action is highly simplified, since typically a photon will be reflected back and forth in each optical cavity before it undergoes Raman scattering that results in a photon of longer wavelength that then passes out of the cavity into the next optical cavity.

Figure 2:
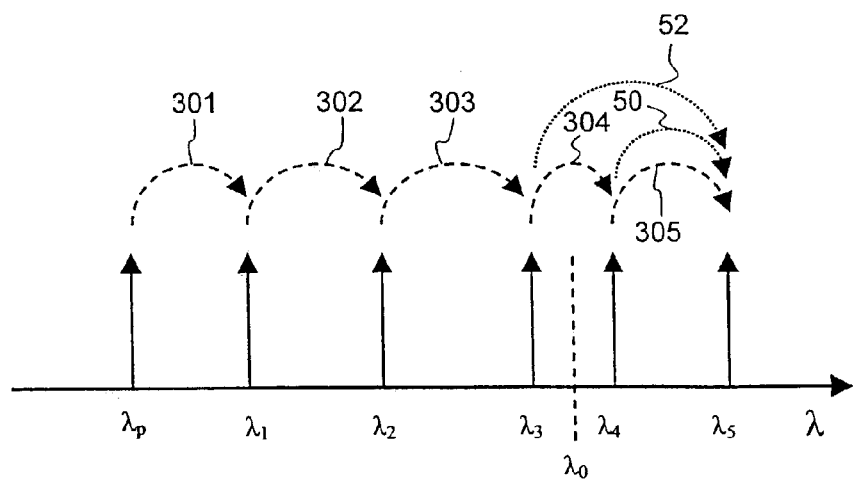
FIG. 2 is a schematic representation of the Stokes lines of the laser shown in FIG. 1 in the wavelength domain, illustrating the energy transfer between adjacent lines.

FIG. 2 shows the energy transfer of the Raman cascade. In this schematical representation, subsequent energy transfer from pump radiation with wavelength $\lambda_p$ to radiation of wavelength $\lambda_1$ and then from radiation of wavelength $\lambda_i$ to $\lambda_{i+1}$ (i.e. subsequent Stokes lines) is indicated by broken arrows 301, 302, ..., 305. As can be seen in FIG. 2, the wavelength shifts between different stages of the Raman cascade (subsequent Stokes lines) do not have necessarily to be equal. It should be noted that, due to the process of Raman scattering and optical losses in the optical fibers, the intensity at a wavelength $\lambda_i$ is always smaller than the intensity at wavelength $\lambda_{i-1}$. This means that at output 28 of laser 10 only a fraction of the optical power is available that has been coupled into input section 14 by pump source 12.

In the laser schematically shown in FIG. 1 the center wavelengths $\lambda_1, \lambda_2, \ldots, \lambda_5$ are chosen so that $$1/\lambda_5 = 1/\lambda_4 + 1/\lambda_3 - 1/\lambda_2. \quad (1)$$

This condition reflects energy conservation in the case of four-wave mixing. The zero-dispersion wavelength $\lambda_0$ of Raman fiber 20 is chosen so that it substantially equals $(\lambda_3+\lambda_4)/2$ (see FIG. 2). The latter condition will be referred to as the phase matching condition that is required for four-wave mixing to occur.

Alternatively, if the center wavelengths $\lambda_1, \lambda_2, \ldots, \lambda_5$ are chosen so that $$1/\lambda_5 = 2/\lambda_4 - 1/\lambda_3 \quad (2)$$

and the zero-dispersion wavelength $\lambda_0$ of Raman fiber 20 substantially equals $\lambda_4$, thus corresponding to the last but one Stokes line, the energy conservation and the phase matching condition for three-wave mixing will be fulfilled.

The effects of four- and three-wave mixing are explained in the following with reference to FIGS. 3a, 3b, 4a and 4b.

Four-wave mixing is a type of optical Kerr effect and occurs when light of three different wavelengths is launched into a fiber, giving rise to a new wave (known as an idler), the wavelength of which does not coincide with any of the others.

Figure 3A:
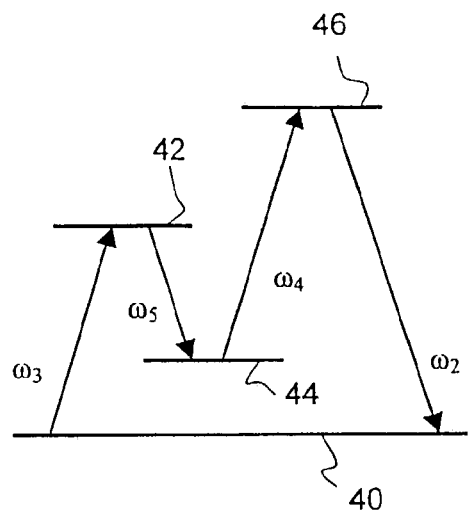
FIG. 3a is a simplified energy level diagram illustrating the process of four-wave mixing in an optical fiber.

FIG. 3a shows a simplified energy level diagram in which a ground state is designated by 40 and three excited states are designated by 42, 44 and 46, respectively. In the case of four-wave mixing, a first and a second pump photon with frequency $\omega_3$ and $\omega_4$, respectively, are absorbed, and a Stokes side band photon of frequency $\omega_5$ and an anti-Stokes photon of frequency $\omega_2$ are created.

Four-wave mixing occurs only if the following energy conservation condition is fulfilled:

$$\omega_5 = \omega_4 + \omega_3 - \omega_2 \quad (3)$$

which corresponds to equation (1).

In addition the interacting photons have to obey phase matching conditions.

Figure 3B:
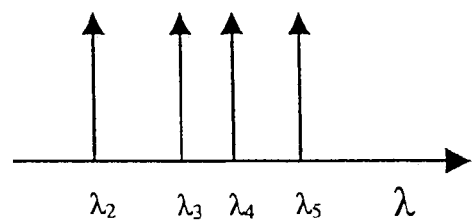
FIG. 3b is a schematic diagram illustrating four-wave mixing in the wavelength domain.

FIG. 3b schematically shows the effect of four-wave mixing in the wavelength domain. As can be seen, it is possible to generate with two pump beams of wavelengths $\lambda_3$ and $\lambda_4$ radiation with upshifted wavelength $\lambda_5$ and downshifted wavelength $\lambda_2$. For the cascaded Raman laser 10 of FIG. 1 this effect means that an additional energy transfer takes place from radiation with wavelength $\lambda_4$ and radiation of wavelength $\lambda_3$ to the laser's emitting wavelength $\lambda_5$. In FIG. 2 this effect is illustrated by additional arrows 50 and 52, shown in dotted lines. The additional energy transfer results in a more direct and faster energy transfer to the last Stokes line with emitting wavelength $\lambda_5$.

Figure 4A:
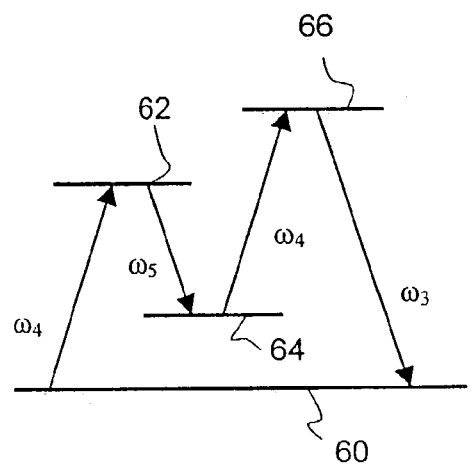
Figure 4B:
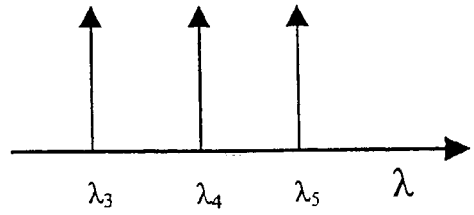
FIG. 4b is a schematic diagram illustrating three-wave mixing in the wavelength domain in a representation similar to that of FIG. 3b.

FIGS. 4a and 4b show similar schematic diagrams as in FIGS. 3a and 3b. The diagram of FIG. 4a differs from that of FIG. 3a with respect to the energy levels of the excited states 62, 64 and 66. The energy difference between excited states 62 and the ground state 60 is the same as the energy difference between excited state 66 and excited state 64. This means that two photons of identical energy (frequency $\omega_4$) can generate two other photons, one Stokes photon with lower energy $\omega_5$ and one Anti-Stokes photon with higher energy $\omega_3$. This case of two identical pump photons is referred to as degenerated four-wave mixing or also as three-wave mixing.

The energy conservation condition in this case is $$\omega_5 = 2\omega_4 - \omega_3 \quad (4)$$

which corresponds to equation (2).

Figure 5:
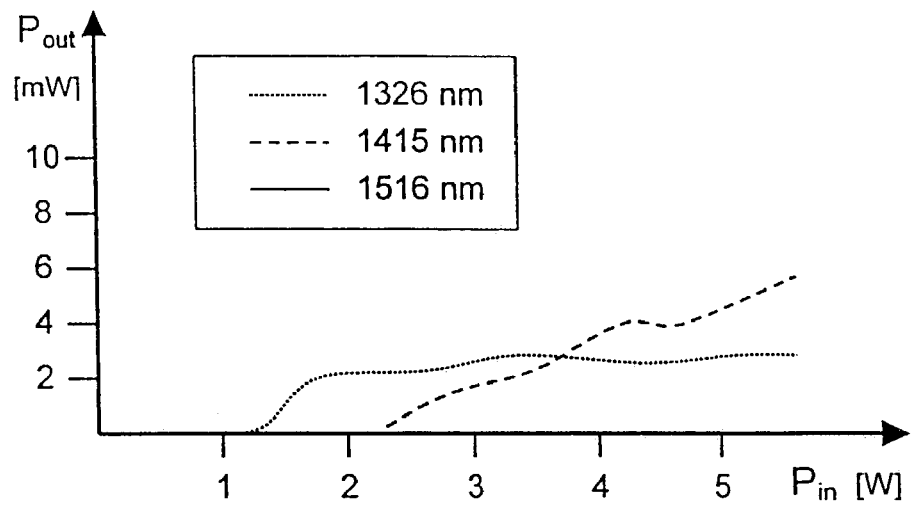
FIG. 5 is a graph showing experimental results of the optical power present at different wavelengths for increasing pump power $P_{in}$ in a conventional laser, illustrating the pump threshold for the excitation of different Stokes lines.
Figure 6:
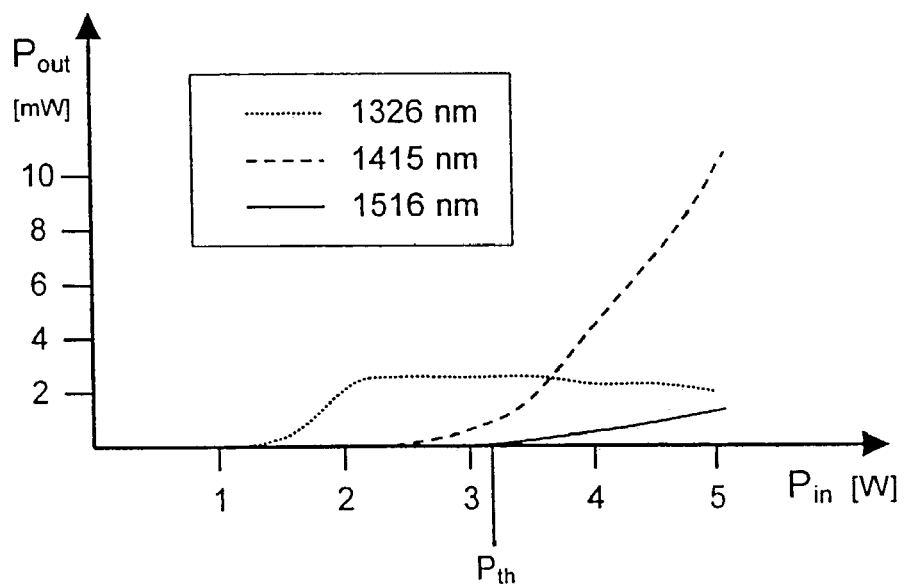
FIG. 6 is a similar graph as in FIG. 5, but for a laser according to the present invention.

FIGS. 5 and 6 show results of experiments in which the optical power for different wavelengths has been measured for different optical pump powers $P_{in}$ for a conventional three stage cascaded Raman laser and for a three stage cascaded Raman laser according to the invention, respectively. As can be seen when comparing FIGS. 5 and 6, substantial optical power is generated at lower wavelengths $\lambda_1 = 1326$ nm and $\lambda_2 = 1415$ nm approximately for the same optical pump power $P_{in}$. However, the last Stokes line (emitting line of the laser) corresponding to wavelength $\lambda_3 = 1516$ nm is not excited in the conventional Raman laser for optical pump powers $P_{in}$ in the range up to 5 W.

The new cascaded Raman laser exploiting three-wave mixing, to the contrary, allows the generation of the last Stokes line with wavelength $\lambda_3 = 1516$ nm with an optical pump power threshold $P_{th}$ of only about 3 W. This is due to the additional energy transfer from the second to the third Stokes line by three-wave mixing. The new cascaded Raman laser thus allows to produce an output radiation with very low optical pump power thresholds.

Figure 7:
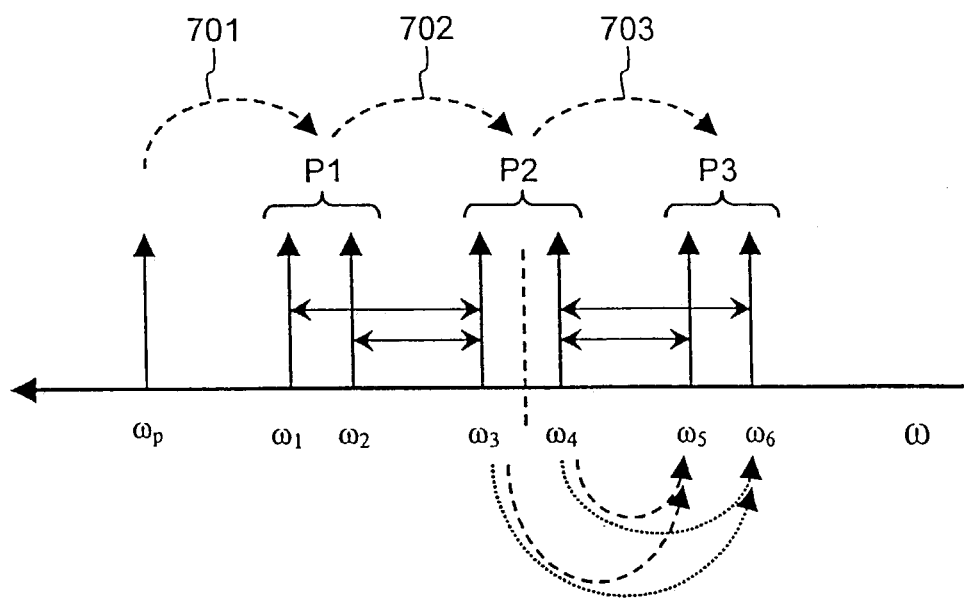
FIG. 7 is a schematic representation of the Stokes lines in the frequency domain of another embodiment of a laser according to the invention, illustrating the energy transfer between adjacent pairs of Stokes lines with assisting four-wave mixing.

FIG. 7 shows a schematic representation of the Stokes lines in the frequency domain of another embodiment of a laser according to the invention. The wavelength selectors are chosen in this embodiment such that, in two first Stokes transitions indicated commonly by 701, a pair P1 of Stokes lines with frequencies $\omega_1$ and $\omega_2$ are generated from pump radiation of frequency $\omega_p$. This pair P1 of Stokes lines with frequencies $\omega_1$ and $\omega_2$ then undergoes another Stokes transition indicated commonly by 702, resulting in a second pair P2 of Stokes lines with frequencies $\omega_3$ and $\omega_4$. In a further transition 703 a third pair P3 of Stokes lines with frequencies $\omega_5$ and $\omega_6$ is generated.

In order to achieve an energy transfer assisted by four-wave mixing between adjacent pairs P2 and P3 of Stokes lines, the following energy conservation conditions have to be fulfilled:

$$\omega_6 = \omega_4 + \omega_3 - \omega_1 \quad (5)$$

and $$\omega_5 = \omega_4 + \omega_3 - \omega_2 \quad (6)$$

or, if written in the wavelength domain, $$1\lambda_6 = 1/\lambda_4 + 1/\lambda_3 - 1/\lambda_1 \quad (7)$$

and $$1\lambda_5 = 1/\lambda_4 + 1/\lambda_3 - 1/\lambda_2, \quad (8)$$

respectively. The phase matching condition will be $$\lambda_0 = (\lambda_3 + \lambda_4)/2. \quad (9)$$

The frequency differences of equations (5) and (6) are indicated in FIG. 7 by horizontal arrows.

If these conditions are fulfilled, the energy transfer to the last two Stokes lines with frequencies $\omega_5$ and $\omega_6$ is assisted by four-wave mixing. In effect, two lasers as shown in FIG. 1 are thus combined in a single device, resulting in a cascaded Raman laser that may, for example, be configured such that it has not only one but two low-power outputs.

Figure 8:
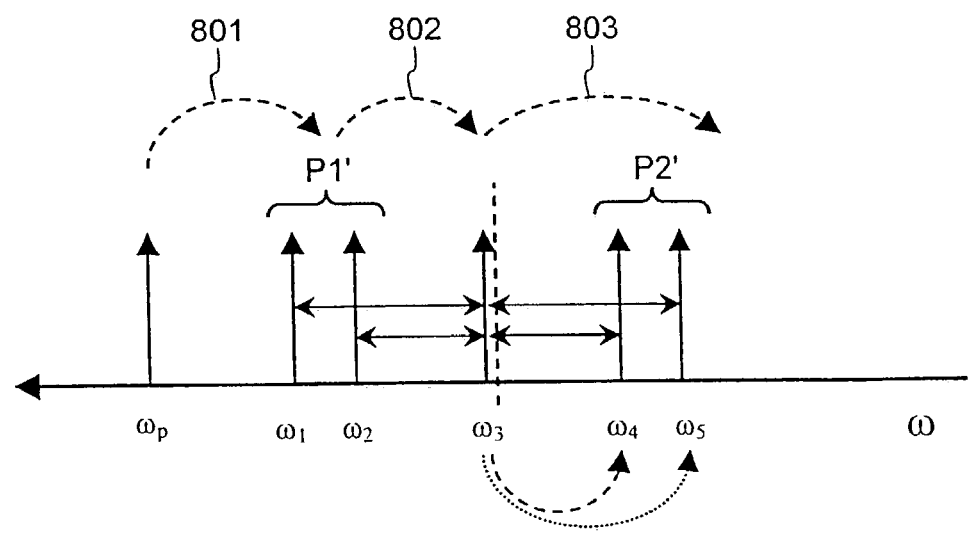
FIG. 8 is a schematic representation of the Stokes lines in the frequency domain of a still further embodiment of a laser according to the invention, illustrating the energy transfer between adjacent pairs of Stokes lines with assisting three-wave mixing.

FIG. 8 shows a schematic representation of the Stokes lines in the frequency domain of still another embodiment of a laser according to the invention. This embodiment differs from that shown in FIG. 7 in that three-wave mixing instead of four-wave mixing assists the Stokes transitions.

Again, a pair P1 of Stokes lines with frequencies $\omega_1$ and $\omega_2$ are generated from pump radiation of wavelength $\omega_p$ in two first Stokes transitions indicated commonly by 801. This pair P1' of Stokes lines with frequencies $\omega_1$ and $\omega_2$ then undergoes another Stokes transition indicated by 802, resulting in a single Stokes line with frequency $\omega_3$. In a further transition 803 a second pair P2' of Stokes lines with frequencies $\omega_4$ and $\omega_5$ are generated.

In order to achieve an energy transfer assisted by three-wave mixing the following energy conservation conditions have to be fulfilled:

$$\omega_5 = 2\omega_3 - \omega_1 \quad (10)$$

and $$\omega_4 = 2\omega_3 - \omega_2 \quad (11)$$

or, if written in the wavelength domain, $$1/\lambda_5 = 2/\lambda_3 + 1/\lambda_1 \quad (12)$$

and $$1/\lambda_4 = 2/\lambda_3 - 1/\lambda_2 \quad (13)$$

respectively. The phase matching condition will be $$\lambda_0 = \lambda_3. \quad (14)$$

Again the result is a cascaded Raman laser that allows to couple out two stable low-power outputs.

What is claimed is:

1. A cascaded Raman laser comprising:
   a) a pump radiation source emitting at a pump wavelength $\lambda_p$,
   b) an input section and an output section made of an optical medium, each section comprising wavelength selectors for wavelengths $\lambda_1, \lambda_2, \ldots, \lambda_{n-k}$, where $n \geq 3$, $\lambda_p < \lambda_1 < \lambda_2 < \ldots < \lambda_{n-1} < \lambda_n$ and $\lambda_{n-k+1}, \lambda_{n-k+2}, \ldots, \lambda_n$ being $k \geq 1$ emitting wavelengths of the laser, and
   c) an intracavity section that is made of a non-linear optical medium, has a zero-dispersion wavelength $\lambda_0$ and is disposed between the input and the output section, wherein
   d) the wavelengths $\lambda_1, \lambda_2, \ldots, \lambda_{n-k}$ of the wavelength selectors and the zero-dispersion wavelength $\lambda_0$ of the intracavity section are chosen such that energy is transferred between radiation of different wavelengths by multi-wave mixing.

2. The laser of claim 1, wherein at least one of the emitting wavelengths $\lambda_{n-k+1}, \lambda_{n-k+2}, \ldots, \lambda_n$ of the laser is involved in multi-wave mixing.

3. The laser of claim 1, wherein the wavelengths $\lambda_1, \lambda_2, \ldots, \lambda_{n-k}$ of the wavelengths selectors are chosen so that energy transfer by multi-wave mixing involves at least three adjacent wavelengths.

4. The laser of claim 3, wherein the wavelengths $\lambda_1, \lambda_2, \ldots, \lambda_{n-k}$ of the wavelength selectors are chosen so that $$1/\lambda_i = 1/\lambda_{i-1} + 1/\lambda_{i-2} - 1/\lambda_{i-3},$$

where $i = 3, 4, \ldots, n$, and that the zero-dispersion wavelength $\lambda_0$ of the intracavity section substantially equals $(\lambda_{i-1} + \lambda_{i-2})/2$.

5. The laser of claim 3, wherein the wavelengths $\lambda_1, \lambda_2, \ldots, \lambda_{n-k}$ of the wavelength selectors are chosen so that $$1/\lambda_i = 2/\lambda_{i-1} - 1/\lambda_{i-2},$$

where $i = 3, 4, \ldots, n$, and that the zero-dispersion wavelength $\lambda_0$ of the intracavity section substantially equals $\lambda_{i-1}$.

6. The laser of claim 1, wherein the wavelengths $\lambda_1, \lambda_2, \ldots, \lambda_{n-k}$ of the wavelengths selectors are chosen so that energy transfer by multi-wave mixing involves at least three nonadjacent wavelengths.

7. The laser of claim 6, wherein $k = 2$ and that the wavelengths $\lambda_1, \lambda_2, \ldots, \lambda_{n-2}$ of the wavelengths selectors are chosen so that $$1/\lambda_i = 1/\lambda_{i-2} + 1/\lambda_{i-3} - 1/\lambda_{i-5}$$

and $$1/\lambda_{i-1} = 1/\lambda_{i-2} + 1/\lambda_{i-3} - 1/\lambda_{i-4},$$

where $i = 5, 6, \ldots, n$, and that the zero-dispersion wavelength $\lambda_0$ of the intracavity section substantially equals $(\lambda_{i-2} + \lambda_{i-3})/2$.

8. The laser of claim 6, wherein $k = 2$ and that the wavelengths $\lambda_1, \lambda_2, \ldots, \lambda_{n-1}$ of the wavelengths selectors are chosen so that $$1\lambda_i = 2/\lambda_{i-2} - 1/\lambda_{i-4}$$

and $$1/\lambda_{i-1} = 2/\lambda_{i-2} - 1/\lambda_{i-3},$$

where $i = 5, 6, \ldots, n$, and that the zero-dispersion wavelength $\lambda_0$ of the intracavity section substantially equals $\lambda_{i-2}$.

9. The laser of claim 1, wherein for each emitting wavelength an additional wavelength selector for wavelength $\lambda_{n-k+1}, \lambda_{n-k+2}, \ldots, \lambda_n$, respectively, is provided in the input section (14) and in the output section.

10. The laser of claim 1, wherein the wavelength selectors are reflectors having center wavelengths $\lambda_1, \lambda_2, \ldots, \lambda_{n-k}$.

* * * * *